(12) United States Patent
Chen

(10) Patent No.: US 12,169,332 B2
(45) Date of Patent: Dec. 17, 2024

(54) COLOR FILTER SUBSTRATE, MANUFACTURING METHOD THEREOF, AND DISPLAY PANEL

(71) Applicant: TCL CHINA STAR OPTOELECTRONICS TECHNOLOGY CO., LTD., Shenzhen (CN)

(72) Inventor: Lixuan Chen, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/787,532

(22) PCT Filed: Jun. 8, 2022

(86) PCT No.: PCT/CN2022/097648
§ 371 (c)(1),
(2) Date: Jun. 20, 2022

(87) PCT Pub. No.: WO2023/221199
PCT Pub. Date: Nov. 23, 2023

(65) Prior Publication Data
US 2024/0184159 A1    Jun. 6, 2024

(30) Foreign Application Priority Data
May 16, 2022  (CN) .......................... 202210527304.8

(51) Int. Cl.
*G02F 1/1335* (2006.01)

(52) U.S. Cl.
CPC .. *G02F 1/133514* (2013.01); *G02F 1/133512* (2013.01); *G02F 1/133516* (2013.01)

(58) Field of Classification Search
CPC ......... G02F 1/133512; G02F 1/133514; G02F 1/133516
See application file for complete search history.

(56) References Cited

U.S. PATENT DOCUMENTS

| | | | |
|---|---|---|---|
| 2003/0043318 A1* | 3/2003 | Kim | .................. G02F 1/133514 349/106 |
| 2006/0146235 A1 | 7/2006 | Oh et al. | |
| | | (Continued) | |

FOREIGN PATENT DOCUMENTS

| | | |
|---|---|---|
| CN | 1797111 A | 7/2006 |
| CN | 101042445 A | 9/2007 |
| | (Continued) | |

OTHER PUBLICATIONS

Chinese Office Action issued in corresponding Chinese Patent Application No. 202210527304.8 dated Apr. 4, 2023, pp. 1-8, 19pp.

(Continued)

*Primary Examiner* — Jessica M Merlin
(74) *Attorney, Agent, or Firm* — The Roy Gross Law Firm, LLC; Roy Gross

(57) ABSTRACT

A color filter substrate, a manufacturing method thereof, and a display panel are provided. The color filter substrate includes a color filter layer. The color filter layer includes a plurality of color resist units distributed on a base substrate, and an intersection area is defined between two adjacent color resist units. The color filter layer can be directly used as an electrode on the color filter substrate. That is, when manufacturing the color filter substrate, a step of manufacturing a conductive film layer can be omitted, thereby improving production efficiency of the color filter substrate, and meanwhile reducing production cost of the color filter substrate.

20 Claims, 4 Drawing Sheets

(56) References Cited

U.S. PATENT DOCUMENTS

| | | | |
|---|---|---|---|
| 2014/0354926 A1* | 12/2014 | Park | G02F 1/133512 349/110 |
| 2016/0357278 A1 | 12/2016 | Qu et al. | |
| 2019/0094608 A1* | 3/2019 | Wan | G02F 1/134309 |
| 2019/0113787 A1* | 4/2019 | Cao | G02F 1/1339 |

FOREIGN PATENT DOCUMENTS

| | | |
|---|---|---|
| CN | 101702041 A | 5/2010 |
| CN | 104020603 A | 9/2014 |
| CN | 104749674 A | 7/2015 |
| CN | 105093647 A | 11/2015 |
| CN | 105629560 A | 6/2016 |
| CN | 105845028 A | 8/2016 |
| CN | 105974728 A | 9/2016 |
| CN | 107589586 A | 1/2018 |
| CN | 108919557 A | 11/2018 |
| CN | 208999715 U | 6/2019 |
| FR | 2887641 A1 | 12/2006 |
| JP | H0659116 A | 3/1994 |
| JP | H0729529 A | 1/1995 |
| JP | H0876106 A | 3/1996 |
| JP | 2000206521 A | 7/2000 |
| JP | 2008281594 A | 11/2008 |
| WO | 2006064905 A1 | 6/2006 |

OTHER PUBLICATIONS

PCT International Search Report for International Application No. PCT/CN2022/097648, mailed on Dec. 22, 2022, 10pp.

PCT Written Opinion of the International Search Authority for International Application No. PCT/CN2022/097648, mailed on Dec. 22, 2022, 9pp.

Japanese Office Action issued in corresponding Japanese Patent Application No. 特願2022-571286 dated Jul. 30, 2024, pp. 1-4, 8pp.

* cited by examiner

COLOR FILTER SUBSTRATE, MANUFACTURING METHOD THEREOF, AND DISPLAY PANEL

This application is a National Phase of PCT Patent Application No. PCT/CN2022/097648 having International filing date of Jun. 8, 2022, which claims the benefit of priority of Chinese Application No. 202210527304.8, filed May 16, 2022, the contents of which are all incorporated herein by reference in their entirety.

FIELD OF INVENTION

The present disclosure relates to the field of display technologies, and more particularly, to a color filter substrate, a manufacturing method thereof, and a display panel.

BACKGROUND OF INVENTION

Liquid crystal displays (LCDs) have many advantages such as thin body, power saving, and no radiation, and have been widely used. For example, they are used as LCD TVs, mobile phones, personal digital assistants (PDAs), digital cameras, computer screens, notebook computer screens, etc. Usually, liquid crystal display panels are composed of a color filter (CF) substrate, a thin film transistor (TFT) array substrate, and a liquid crystal layer sandwiched between the color filter substrate and the thin film transistor array substrate.

Technical problem: the array substrate is provided with pixel electrodes, and the color filter substrate is also provided with a conductive film layer to form an electric field between the array substrate and the color filter substrate that can control the orientation of liquid crystals. However, disposing the conductive film layer on the color filter substrate will prolong a process cycle of the color filter substrate, thereby affecting production efficiency.

SUMMARY OF INVENTION

An embodiment of the present disclosure provides a color filter substrate, a manufacturing method thereof, and a display panel to solve problems that disposing a conductive film layer on a color filter substrate will prolong a process cycle of the color filter substrate and affect production efficiency.

In a first aspect, an embodiment of the present disclosure provides a color filter substrate, which includes:
 a base substrate; and
 a color filter layer disposed on the base substrate, wherein, the color filter layer includes a plurality of color resist units distributed on the base substrate, an intersection area is defined between two adjacent color resist units, and a manufacturing material of the color resist units includes a photoresist material and a conductive material.

In a second aspect, an embodiment of the present disclosure provides a display panel, which includes:
 an array substrate, a liquid crystal layer, and a color filter substrate, wherein, the liquid crystal layer is disposed between the array substrate and the color filter substrate;
 wherein, the color filter substrate includes:
 a base substrate; and
 a color filter layer disposed on the base substrate, wherein, the color filter layer includes a plurality of color resist units distributed on the base substrate, an intersection area is defined between two adjacent color resist units, and a manufacturing material of the color resist units includes a photoresist material and a conductive material.

In a third aspect, an embodiment of the present disclosure provides a manufacturing method of a color filter substrate. The method includes following steps:
 providing a base substrate; and
 disposing a color filter layer on the base substrate, wherein, the color filter layer includes a plurality of color resist units, and forming an intersection area between two adjacent color resist units, wherein, a manufacturing material of the color resist units includes a photoresist material and a conductive material.

BENEFICIAL EFFECT

In the color filter substrate provided in the embodiment of the present disclosure, the color resist units are made of the photoresist material and the conductive material to allow the color resist units to have conductivity, and the intersection area is formed between each two adjacent color resist units to allow electrical conduction to be formed between the color resist units. Therefore, the color filter layer can be directly used as an electrode of the color filter substrate, and similarly, an electric field can be formed between the color filter substrate and the array substrate to control the orientation of liquid crystals in the liquid crystal layer. That is, when manufacturing the color filter substrate, a step of manufacturing a conductive film layer can be omitted, thereby shortening the process cycle of the color filter substrate, improving the production efficiency of the color filter substrate, and meanwhile reducing the production cost of the color filter substrate.

DETAILED DESCRIPTION OF PREFERRED EMBODIMENTS

The technical solutions in the embodiments of the present disclosure will be clearly and completely described below with reference to the drawings in the embodiments of the present disclosure. Obviously, the described embodiments are only a part of the embodiments of the present disclosure but not all the embodiments. Based on the embodiments in the present disclosure, all other embodiments obtained by those skilled in the art without creative efforts are within the scope of the present disclosure.

The embodiments of the present disclosure provide a color filter substrate 100, a manufacturing method thereof, and a display panel to shorten a process cycle of the color filter substrate 100, thereby improving production efficiency. They will be described below with reference to the accompanying drawings.

Figure 1:
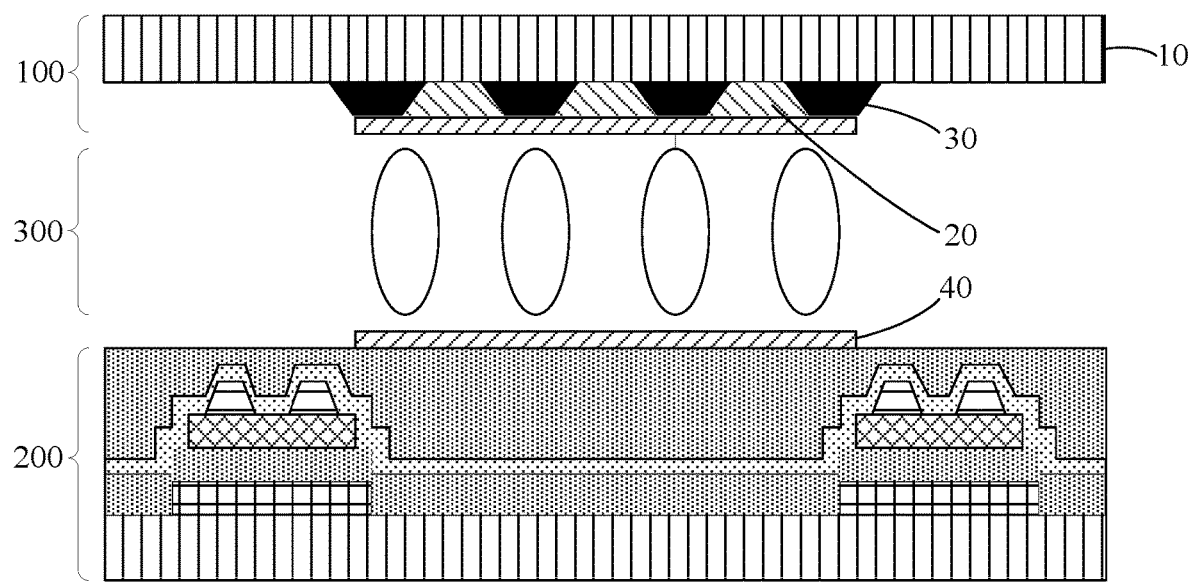
FIG. 1 is a schematic cross-sectional diagram of a display panel in current technology.

Referring to FIG. 1, FIG. 1 is a schematic cross-sectional diagram of a display panel in current technology. Usually, liquid crystal display panels are composed of a color filter (CF) substrate 100, a thin film transistor (TFT) array substrate 200, liquid crystals (LC) sandwiched between the color filter substrate 100 and the thin film transistor array substrate 200, and a sealant. The manufacturing process usually comprises a front-end array process of the array substrate 200 and the color filter substrate 100 (thin film, lithography, etching, and film peeling), an intermediate cell process (attachment of TFT substrate to CF substrate), and a back-end module assembly process (laminating driver IC and printed circuit board). Wherein, the front-end array process is mainly to form the array substrate 200 and the color filter substrate 100 for controlling the motion of liquid crystal molecules; the intermediate cell process is to add the liquid crystals between the array substrate 200 and the color filter substrate 100; and the back-end module assembly process is mainly to laminate the driver IC and integrate the printed circuit board to drive the liquid crystal molecules to rotate and display images.

The color filter substrate 100 is an important part of liquid crystal displays. A manufacturing method of a traditional color filter substrate 100 is to fabricate a black matrix (BM) 30 on a base substrate 10, and then fabricate a color resist layer (which includes red color resists, green color resists, and blue color resists). A conductive film layer is needed to be manufactured on the color resist layer to form an electric field between pixel electrodes 40 of the array substrate 200 and the conductive film layer, thereby controlling the motion of the liquid crystal molecules in the electric field. The fabrication of the conductive film layer will prolong the process cycle of the color filter substrate 100 and reduce the production efficiency of the color filter substrate 100.

Figure 2:
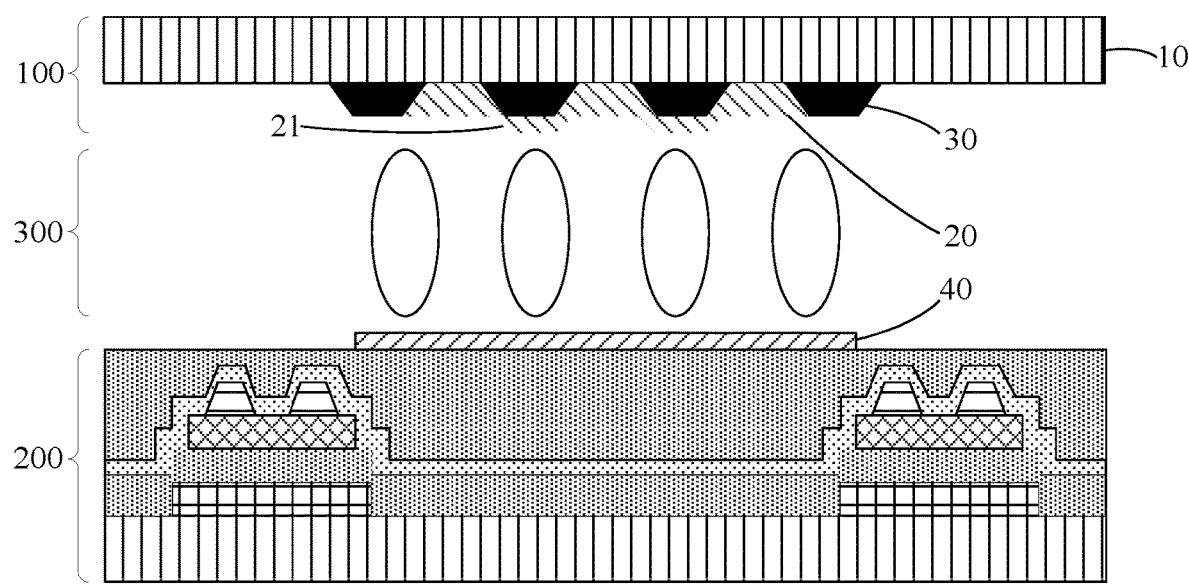
FIG. 2 is a schematic cross-sectional diagram of a color filter substrate according to an embodiment of the present disclosure.

Referring to FIG. 2, FIG. 2 is a schematic cross-sectional diagram of the color filter substrate 100 according to an embodiment of the present disclosure. The color filter substrate 100 provided in the embodiment of the present disclosure includes a base substrate 10 and a color filter layer disposed on the base substrate 10. Wherein, the color filter layer includes a plurality of color resist units 20 distributed on the base substrate 10, an intersection area 21 is defined between two adjacent color resist units 20, and a manufacturing material of the color resist units 20 includes a photoresist material and a conductive material.

Specifically, in this embodiment, the base substrate 10 may be a transparent glass substrate or a transparent flexible substrate, which is not limited herein. The color resist units 20 can be manufactured by coating, exposing, and developing a color resist material layer. The color resist material layer is formed by mixing at least the photoresist material and the conductive material, so that the color resist units 20 have both a characteristic of transmitting a monochromatic spectrum and an electrical conductivity. For example, the color resist units 20 generally include the red color resist units 20, the green color resist units 20, and the blue color resist units 20, and each color resist unit 20 is able to transmit a corresponding red spectrum, green spectrum, or blue spectrum. Numbers of the three color resist units 20 are all plural, a plurality of pixel combinations are composed of the three color resist units 20, and each of the pixel combinations includes one red color resist unit 20, one green color resist unit 20, and one blue color resist unit 20.

The intersection area 21 is defined between the two adjacent color resist units 20. That is, the two adjacent color resist units 20 will abut, overlap, or blend with each other in the intersection area 21, and it only needs to satisfy that the two adjacent color resist units 20 can be in contact with each other in the intersection area 21. Since the manufacturing material of the color resist units 20 includes the conductive material, adjacent color resist units 20 will be electrically connected to each other in intersection areas 21. That is, the color resist units 20 of the color filter layer are electrically connected to each other to have electrical conduction, so that the color filter layer as a whole will have electrical conductivity. The color filter layer having conductive properties can be used as the conductive film layer, so that an electric field can be formed between the color filter layer and the pixel electrodes 40 on the array substrate 200 to control the motion of the liquid crystal molecules in the liquid crystal layer 300. Therefore, when manufacturing the color filter substrate 100, a process of the conductive film layer can be omitted, thereby shortening the overall process cycle of the color filter substrate 100 and improving the production efficiency of the color filter substrate 100.

The manufacturing material of the color resist units 20 includes the photoresist material and the conductive material, wherein, main components of the photoresist material include a solvent, a pigment, a dispersant, a monomer, a polymer, and a photoinitiator. The photoresist material enables the color resist units 20 to absorb a part of the spectrum of natural light and transmit only a matching monochromatic spectrum to form a primary color in the color mixing. The conductive material enables the color resist units 20 to have conductive ability. Specifically, the conductive material may be at least one of a conductive nanomaterial, a carbon material, or an organic conductive polymer, and of course, may be other types of conductive material.

The conductivity of the conductive film layer is related to its electrical conductivity and thickness. When the electrical conductivity is higher and the thickness is thicker, the conductivity will be better. In the color filter substrate 100 of current technology, the conductive film layer is usually an ITO film layer, and its thickness is generally controlled to range from 0.09 microns to 0.15 microns, so that the ITO film layer can have sufficient electrical conductivity. In the color filter substrate 100 of the embodiment of the present disclosure, in order to ensure the light transmittance of the color filter layer, the thickness of the color filter layer is controlled to range from 1.0 microns to 2.5 microns. That is, the electrical conductivity of the color resist units 20 only needs to be about 1/10 of that of the ITO film layer to realize the same conductive effect as the ITO film layer.

For example, the conductive material includes the conductive nanomaterial, and a weight percentage of the conductive nanomaterial in the color resist units 20 ranges from 10 wt % to 50 wt %. For example, it may be 10 wt %, 15 wt %, 20 wt %, 25 wt %, 30 wt %, 35 wt %, 40 wt %, 45 wt %, or 50 wt %. The conductive nanomaterial may be, for example, silver nanowires. In addition to the excellent electrical conductivity of silver, the silver nanowires also have excellent light transmittance and flexibility due to the nanoscale size effect. Therefore, mixing the silver nanowires into the photoresist material can not only make the color resist units 20 conductive, but also reduce the influence on the light transmittance. Setting the weight percentage of the conductive nanomaterial in the color resist units 20 to range from 10 wt % to 50 wt % can allow the color resist units 20 to have sufficient conductivity and can prevent from affecting the light transmittance of the color resist units 20 due to an overly high ratio of the conductive nanomaterial.

For example, the conductive material includes the carbon material, and a weight percentage of the carbon material in the color resist units 20 ranges from 10 wt % to 50 wt %. For example, it may be 10 wt %, 15 wt %, 20 wt %, 25 wt %, 30 wt %, 35 wt %, 40 wt %, 45 wt %, or 50 wt %. Specifically, the carbon material may be a nano-carbon material, such as carbon nanospheres, graphene, carbon nanotubes, etc. The nano-carbon material can improve the electrical conductivity of the color resist units 20, thereby allowing the color filter layer to have both electrical conductivity and light transmittance. Setting the weight percentage of the carbon material in the color resist units 20 to range from 10 wt % to 50 wt % can allow the color resist units 20 to have sufficient conductivity and can prevent from affecting the light transmittance of the color resist units 20 due to an overly high ratio of the carbon material.

For example, the conductive material includes the organic conductive polymer, and a weight percentage of the organic conductive polymer in the color resist units 20 ranges from 20 wt % to 50 wt %. For example, it may be 20 wt %, 25 wt %, 30 wt %, 35 wt %, 40 wt %, 45 wt %, or 50 wt %. The organic conductive polymer is a conductive polymer, for example, it may be at least one of polythiophene PEDOT, polyacetylene, or polyaniline. The organic conductive polymer has high compatibility with the photoresist material, which can reduce the influence on the light-transmitting performance and color of the color resist units 20, thereby ensuring the light-transmitting ability of the color resist units 20. Setting the weight percentage of the organic conductive polymer in the color resist units 20 to range from 20 wt % to 50 wt % can allow the color resist units 20 to have sufficient conductivity and can prevent from affecting the light transmittance of the color resist units 20 due to an overly high ratio of the organic conductive polymer.

Since one intersection area 21 is located between two adjacent color resist units 20, the color resist units 20 having different colors will mix to form a new color in the intersection area 21. Stray scattered light cannot be emitted from the intersection area 21 after color mixing, thereby being able to block the stray scattered light. Therefore, the color filter substrate 100 does not need to be provided with the black matrix 30 for shielding the stray scattered light. However, for two adjacent color resist units 20 having a same color, a new color cannot be formed by mixing in the intersection area 21, so it is difficult to block the stray scattered light. In order to solve this problem, a light-shielding structure, such as the black matrix 30, is needed for shielding the intersection area 21 between the two adjacent color resist units 20 having the same color.

Figure 3:
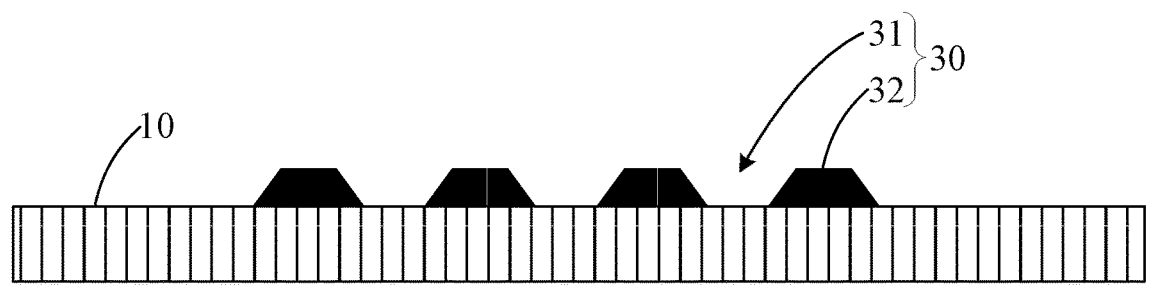
FIG. 3 is a schematic cross-sectional diagram of a black matrix according to an embodiment of the present disclosure.

For example, referring to FIGS. 2 and 3, FIG. 3 is a schematic cross-sectional diagram of the black matrix 30 according to an embodiment of the present disclosure. The color filter substrate 100 further includes the black matrix 30 disposed on the base substrate 10. The black matrix 30 includes a plurality of opening areas 31 and a plurality of light-shielding areas 32, and each of the light-shielding areas 32 is disposed between two adjacent opening areas 31. Each of the color resist units 20 is disposed in each of the opening areas 31, and the intersection area 21 is defined between the two adjacent color resist units 20 on one side of the light-shielding areas 32 away from the base substrate 10.

The role of the black matrix 30 is to block the stray scattered light from the liquid crystal layer 300, thereby preventing color mixing between sub-pixels and preventing ambient light from irradiating on channels of the thin film transistor array substrate 200. In the fabrication of the color filter substrate 100, the black matrix 30 is usually fabricated first, and then the color filter layer is fabricated on the black matrix 30, so that the color resist units 20 can be located in the opening areas 31 of the black matrix 30. The black matrix 30 is fabricated by a process of coating a black material, exposing, and developing, and the color resist units 20 are fabricated by a process of coating color resist materials, exposing, and developing. It should be noted that during the process of coating color resist materials, the color resist materials of the two adjacent color resist units 20 will be coated on the light-shielding area 32 of the black matrix 30 to form the intersection area 21. In order to keep the intersection area 21 during the exposure process, the photomask 50 needs to be adjusted accordingly.

Figure 4:
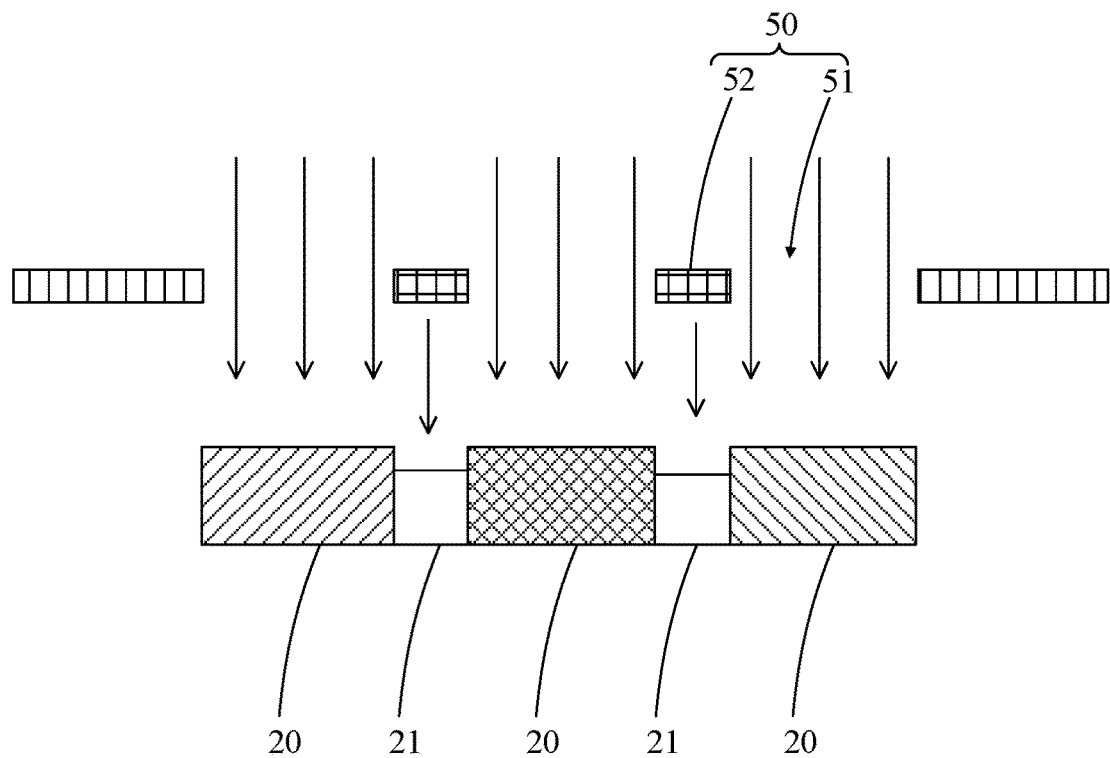
FIG. 4 is a schematic diagram of an exposure process of the color filter layer according to an embodiment of the present disclosure.

For example, referring to FIG. 4, FIG. 4 is a schematic diagram of an exposure process of the color filter layer according to an embodiment of the present disclosure. A grayscale mask 50 may be used as the photomask 50. The grayscale mask 50 has transparent regions 51 and semi-transparent regions 52. The transparent regions 51 correspond to the opening areas 31 of the black matrix 30, and the color resist units 20 can be formed after exposure and development. Making the semi-transparent regions 52 correspond to the light-shielding areas 32 of the black matrix 30, the color filter layer in the intersection areas 21 can be cured during the exposure process, and part of a thickness of the color filter layer in the intersection areas 21 can be reduced. Therefore, after developing, the color filter layer in the intersection areas 21 can be retained, and the thickness of the color filter layer in the intersection areas 21 can be reduced, thereby reducing an influence on overall thickness of the color filter substrate 100.

In another way of retaining the intersection areas 21, the photomask 50 may be an ordinary photomask 50, that is, only the transparent regions and light-shielding regions, and the transparent regions correspond to the opening areas 31 of the black matrix 30. In the display panel, the opening areas 31 of the black matrix 30 correspond to the pixel electrodes 40 on the array substrate 200 by one to one, and a projection area of the opening areas 31 is the same as a projection area of the pixel electrodes 40. Therefore, in the process of exposure by the photomask 50, an area of the transparent regions of the photomask 50 can be appropriately increased to allow the transparent regions of the photomask 50 to be larger than the opening areas 31 of the black matrix 30. In this way, during the exposure process, part of the color filter layer on the light-shielding areas 32 of the black matrix 30 will also be exposed, thereby increasing an exposure area of the color resist materials. Therefore, the projection area of the color resist units 20 on the array substrate 200 can be larger than the projection area of the opening areas 31 of the black matrix 30 and projection area of the pixel electrodes 40, that is, the intersection areas 21 of the color resist units 20 on the light-shielding areas 32 of the black matrix 30 can be cured and retained.

For example, as shown in FIGS. 2 and 3, a width of each of the light-shielding areas 32 is reduced from one end adjacent to the base substrate 10 to another end away from the base substrate 10. In this way, the projection area of the light-shielding areas 32 on the color filter substrate 100 is not affected, that is, a light-shielding area of the light-shielding areas 32 for the stray scattered light is not affected, and the intersection areas 21 between adjacent color resist units 20 can be formed more successfully on the light-shielding areas 32, thereby ensuring overall conductivity of the color filter layer.

Figure 5:
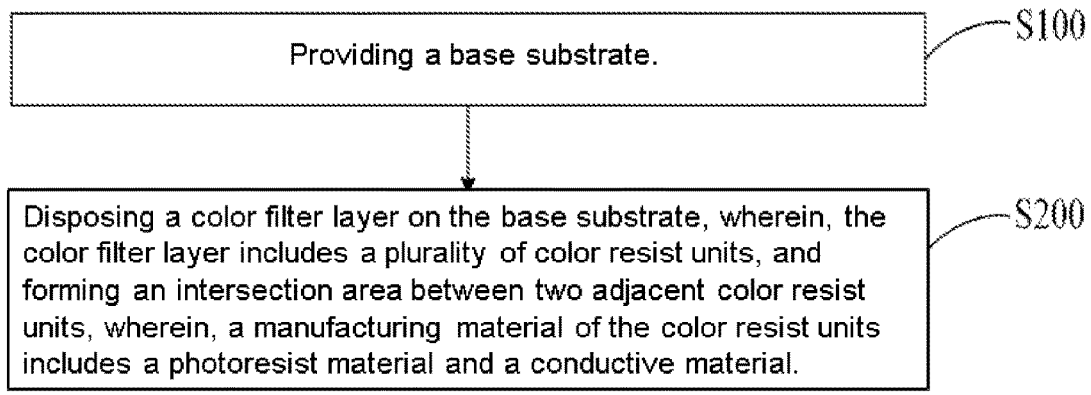
FIG. 5 is a flowchart of a manufacturing method of the color filter substrate according to an embodiment of the present disclosure.

For example, referring to FIG. 5, FIG. 5 is a flowchart of a manufacturing method of the color filter substrate 100 according to an embodiment of the present disclosure. The embodiment of the present disclosure further provides the manufacturing method of the color filter substrate 100 for manufacturing the color filter substrate 100 mentioned above. The manufacturing method includes following steps.

S100: providing the base substrate 10.

S200: disposing the color filter layer on the base substrate 10, wherein, the color filter layer includes the plurality of color resist units 20, and forming the intersection area 21 between the two adjacent color resist units 20, wherein, the manufacturing material of the color resist units 20 includes the photoresist material and the conductive material.

In the step S100, initial cleaning is performed on the base substrate 10. The initial cleaning is to put the base substrate 10 into a cleaning tank, and dust or impurities on a surface of the base substrate 10 is removed using chemical or physical methods to prevent these impurities from affecting subsequent processes. Chromium sputtering is performed on the cleaned base substrate 10 to improve performances of the base substrate 10.

In the step S200, the color resist units 20 may be formed by the process steps of coating the color resist materials, exposing, and developing, wherein, the color resist materials are mixed with the photoresist material and the conductive material. The color resist materials may be pre-prepared before manufacturing the color filter substrate 100, thereby improving the production efficiency of the color filter layer. The color resist units 20 include the three colors of red, green, and blue. The materials of the three colors of the color resist units 20 are basically the same, and the difference lies in pigments. In actual manufacturing processes, the color resist units 20 of one color are usually manufactured first, and then the color resist units 20 of the second and third colors are manufactured in sequence.

Figure 6:
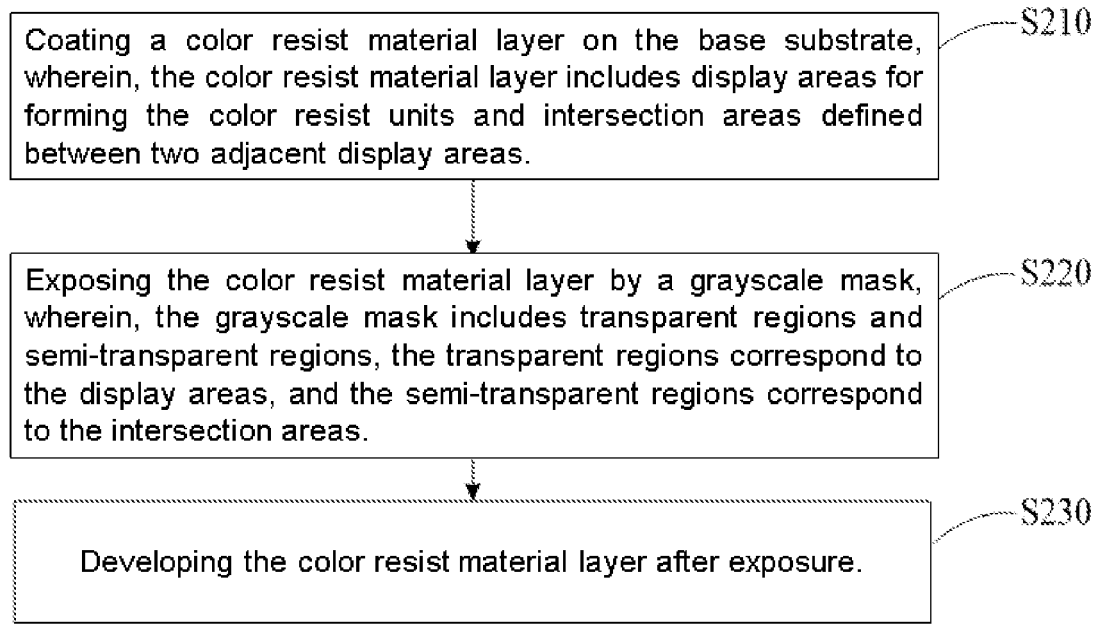
FIG. 6 is a detailed flowchart of the manufacturing method of the color filter substrate according to an embodiment of the present disclosure.

For example, referring to FIG. 6, FIG. 6 is a detailed flowchart of the manufacturing method of the color filter substrate 100 according to an embodiment of the present disclosure. The step of disposing the color filter layer on the base substrate 10 includes following steps:

S210: coating a color resist material layer on the base substrate 10, wherein, the color resist material layer includes display areas for forming the color resist units 20 and the intersection areas 21 defined between two adjacent display areas;

S220: exposing the color resist material layer by the grayscale mask 50, wherein, the grayscale mask 50 includes the transparent regions 51 and the semi-transparent regions 52, the transparent regions 51 correspond to the display areas, and the semi-transparent regions 52 correspond to the intersection areas 21; and S230: developing the color resist material layer after exposure.

In the step S220, the grayscale mask 50 has the transparent regions 51 and the semi-transparent regions 52. The transparent regions 51 correspond to the opening areas 31 of the black matrix 30, and the color resist units 20 can be formed after exposure and development. Making the semi-transparent regions 52 correspond to the light-shielding areas 32 of the black matrix 30, the color filter layer in the intersection areas 21 can be partially cured during the exposure process, and part of the thickness of the color filter layer in the intersection areas 21 can be reduced. Therefore, after developing, the color filter layer in the intersection areas 21 can be retained, and the thickness of the color filter layer in the intersection areas 21 can be reduced, thereby reducing the influence on the overall thickness of the color filter substrate 100. It can be understood that in this embodiment, the retained portion of the intersection areas 21 refers to thinning the thickness of the intersection areas 21 in a thickness direction of the color filter substrate 100 during the exposure and development process, and the thinned intersection areas 21 will still effectively connect the adjacent color resist units 20.

In the step S230, cured color resist units 20 can be obtained after developing exposed color resist material layer. Since the intersection areas 21 are also partially cured during the exposure process, a part of the intersection areas 21 can also be effectively retained after development.

Figure 7:
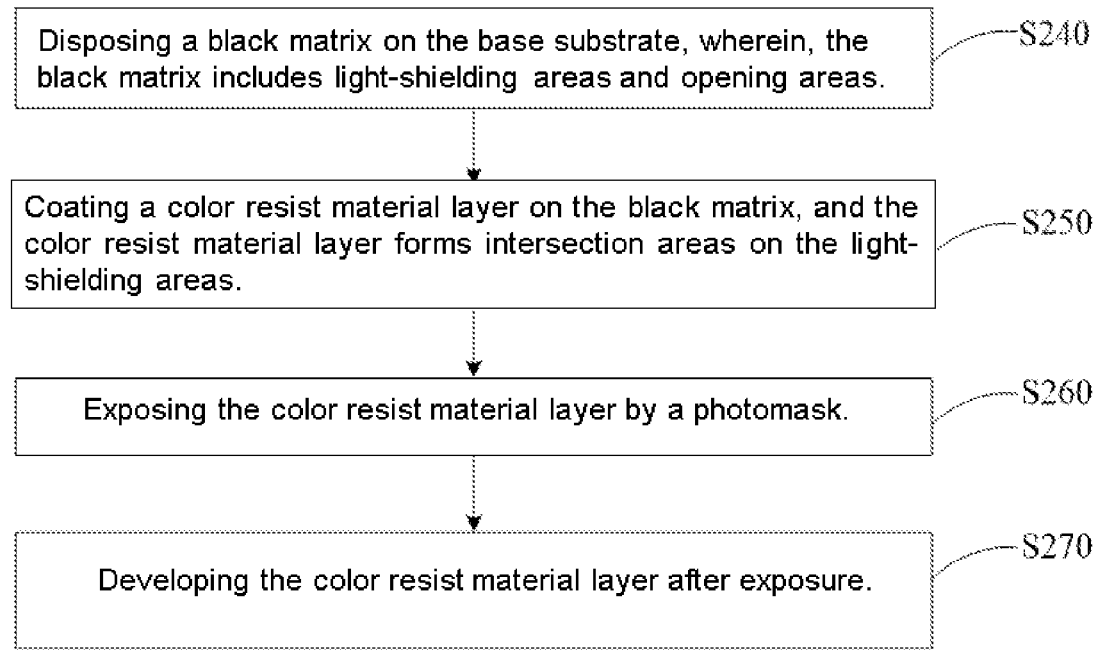
FIG. 7 is another detailed flowchart of the manufacturing method of the color filter substrate according to an embodiment of the present disclosure.

For example, referring to FIG. 7, FIG. 7 is another detailed flowchart of the manufacturing method of the color filter substrate 100 according to an embodiment of the present disclosure. The step of disposing the color filter layer on the base substrate 10 includes following steps:

S240: disposing the black matrix 30 on the base substrate 10, wherein, the black matrix 30 includes the light-shielding areas 32 and the opening areas 31;

S250: coating the color resist material layer on the black matrix 30, and the color resist material layer forms the intersection areas 21 on the light-shielding areas 32;

S260: exposing the color resist material layer by the photomask 50; and

S270: developing the color resist material layer after exposure.

In the step S240, the black matrix 30 may be formed by the process steps of coating the black material, exposing, and developing. The role of the black matrix 30 is to block the stray scattered light from the liquid crystal layer 300, thereby preventing color mixing between sub-pixels and preventing ambient light from irradiating on the channels of the thin film transistor array substrate 200. In the fabrication of the color filter substrate 100, the black matrix 30 is usually fabricated first, and then the color filter layer is fabricated on the black matrix 30, so that the color resist units 20 can be located in the opening areas 31 of the black matrix 30. It should be noted that in the step S250, the color resist materials of the two adjacent color resist units 20 will be coated on the light-shielding area 32 of the black matrix 30 to form the intersection areas 21. In order to keep the intersection areas 21 in the step S260, the photomask 50 needs to be adjusted accordingly. One of the adjustment methods may refer to the steps 210 to 230 of the above embodiment.

In another adjustment method of the photomask 50, the photomask 50 may be an ordinary photomask 50, that is, only the transparent regions and light-shielding regions, and the transparent regions correspond to the opening areas 31 of the black matrix 30. In the display panel, the opening areas 31 of the black matrix 30 correspond to the pixel electrodes 40 on the array substrate 200 by one to one, and the projection area of the opening areas 31 is the same as the projection area of the pixel electrodes 40. Therefore, in the process of exposure by the photomask 50, the area of the transparent regions of the photomask 50 can be appropriately increased to allow the transparent regions of the photomask 50 to be larger than the opening areas 31 of the black matrix 30. In this way, during the exposure process, part of the color filter layer on the light-shielding areas 32 of the black matrix 30 will also be exposed, thereby increasing the exposure area of the color resist materials. Therefore, the projection area of the color resist units 20 on the array substrate 200 can be larger than the projection area of the opening areas 31 of the black matrix 30 and projection area of the pixel electrodes 40, that is, the intersection areas 21 of the color resist units 20 on the light-shielding areas 32 of the black matrix 30 can be cured and retained.

In the step S270, cured color resist units 20 can be obtained after developing exposed color resist material layer. Since the intersection areas 21 are also cured during the exposure process, the intersection areas 21 can also be effectively retained after development.

An embodiment of the present disclosure further provides a display panel, which includes an array substrate 200, a liquid crystal layer 300, and the color filter substrate 100 mentioned above. The liquid crystal layer 300 is disposed between the array substrate 200 and the color filter substrate 100. The display panel may be any product or component having a display function, such as an electronic paper, a mobile phone, a tablet computer, a television, a monitor, a notebook computer, a digital photo frame, a navigator, etc.

For example, the array substrate 200 is provided with the pixel electrodes 40 corresponding to the color resist units 20 by one to one, and an projection area of the color resist units 20 on the array substrate 200 is greater than a projection area of the pixel electrodes 40. In the display panel, the opening areas 31 of the black matrix 30 correspond to the pixel electrodes 40 on the array substrate 200 by one to one, and the projection area of the opening areas 31 is the same as the projection area of the pixel electrodes 40. Therefore, in the process of exposure by the photomask 50, the area of the transparent regions of the photomask 50 can be appropriately increased to allow the transparent regions of the photomask 50 to be larger than the opening areas 31 of the black matrix 30. In this way, during the exposure process, part of the color filter layer on the light-shielding areas 32 of the black matrix 30 will also be exposed, thereby increasing the exposure area of the color resist materials. Therefore, the projection area of the color resist units 20 on the array substrate 200 can be larger than the projection area of the opening areas 31 of the black matrix 30 and projection area of the pixel electrodes 40, that is, the intersection areas 21 of the color resist units 20 on the light-shielding areas 32 of the black matrix 30 can be cured and retained.

In the color filter substrate 100 provided in the embodiment of the present disclosure, the color resist units 20 are made of the photoresist material and the conductive material to allow the color resist units 20 to have conductivity, and the intersection area 21 is formed between each two adjacent color resist units 20 to allow electrical conduction to be formed between the color resist units 20. Therefore, the color filter layer can be directly used as an electrode of the color filter substrate 100, and similarly, an electric field can be formed between the color filter substrate 100 and the array substrate 200 to control the orientation of liquid crystals in the liquid crystal layer 300. That is, when manufacturing the color filter substrate 100, the step of manufacturing the conductive film layer can be omitted, thereby shortening the process cycle of the color filter substrate 100, improving the production efficiency of the color filter substrate 100, and meanwhile reducing the production cost of the color filter substrate 100.

In the above embodiments, the description of each embodiment has its own emphasis. For the parts that are not described in detail in an embodiment, refer to the detailed description of other embodiments above.

In addition, terms such as "first" and "second" are used herein for purposes of description and are not intended to indicate or imply relative importance or implicitly indicating the number of technical features indicated. Thus, features limited by "first" and "second" are intended to indicate or imply including one or more than one these features.

The color filter substrate provided by the embodiment of the present disclosure is described in detail above. Specific examples are used herein to explain the principles and implementation of the present disclosure. The descriptions of the above embodiments are only used to help understand the method of the present disclosure and its core ideas; meanwhile, for those skilled in the art, the range of specific implementation and application may be changed according to the ideas of the present disclosure. In summary, the content of the specification should not be construed as causing limitations to the present disclosure.

What is claimed is:

1. A color filter substrate, comprising:
a base substrate;
a color filter layer disposed on the base substrate, wherein the color filter layer comprises a plurality of color resist units distributed on the base substrate, an intersection area is defined between two adjacent color resist units, and a manufacturing material of the color resist units comprises a photoresist material and a conductive material; and
a black matrix disposed on the base substrate;
wherein parts of two adjacent ones of the plurality of color resist units with different colors in the intersection area overlap each other, and a thickness of the parts of the plurality of color resist units located in the intersection area is less than a thickness of another parts of the plurality of color resist units; the black matrix is disposed in the intersection area between two adjacent ones of the plurality of color resist units with a same color, and the intersection area between two adjacent ones of the plurality of color resist units with different colors is not provided with a black matrix.

2. The color filter substrate according to claim 1, wherein the conductive material comprises at least one of a conductive nanomaterial, a carbon material, or an organic conductive polymer.

3. The color filter substrate according to claim 1, wherein the conductive material comprises a conductive nanomaterial, and a weight percentage of the conductive nanomaterial in the color resist units ranges from 10 wt % to 50 wt %.

4. The color filter substrate according to claim 1, wherein the conductive material comprises a carbon material, and a weight percentage of the carbon material in the color resist units ranges from 10 wt % to 50 wt %.

5. The color filter substrate according to claim 1, wherein the conductive material comprises an organic conductive polymer, and a weight percentage of the organic conductive polymer in the color resist units ranges from 20 wt % to 50 wt %.

6. The color filter substrate according to claim 5, wherein the organic conductive polymer comprises at least one of polythiophene, polyacetylene, or polyaniline.

7. The color filter substrate according to claim 1, wherein the black matrix comprises a plurality of opening areas and a plurality of light-shielding areas, and each of the light-shielding areas is disposed between two adjacent opening areas; and wherein each of the color resist units is disposed in each of the opening areas, and the intersection area is defined between the two adjacent color resist units on one side of the light-shielding areas away from the base substrate.

8. The color filter substrate according to claim 7, wherein a width of each of the light-shielding areas is reduced from one end adjacent to the base substrate to another end away from the base substrate.

9. A display panel, comprising:
an array substrate, a liquid crystal layer, and a color filter substrate, wherein the liquid crystal layer is disposed between the array substrate and the color filter substrate;
wherein the color filter substrate comprises:
a base substrate;
a color filter layer disposed on the base substrate, wherein the color filter layer comprises a plurality of color resist units distributed on the base substrate, an intersection area is defined between two adjacent color resist units, and a manufacturing material of the color resist units comprises a photoresist material and a conductive material; and
a black matrix disposed on the base substrate;
wherein parts of two adjacent ones of the plurality of color resist units with different colors in the intersection area overlap each other, and a thickness of the parts of the plurality of color resist units located in the intersection area is less than a thickness of another parts of the plurality of color resist units; the black matrix is disposed in the intersection area between two adjacent ones of the plurality of color resist units with a same color, and the intersection area between two adjacent ones of the plurality of color resist units with different colors is not provided with a black matrix.

10. The display panel according to claim 9, wherein the conductive material comprises at least one of a conductive nanomaterial, a carbon material, or an organic conductive polymer.

11. The display panel according to claim 9, wherein the conductive material comprises a conductive nanomaterial, and a weight percentage of the conductive nanomaterial in the color resist units ranges from 10 wt % to 50 wt %.

12. The display panel according to claim 9, wherein the conductive material comprises a carbon material, and a weight percentage of the carbon material in the color resist units ranges from 10 wt % to 50 wt %.

13. The display panel according to claim 9, wherein the conductive material comprises an organic conductive polymer, and a weight percentage of the organic conductive polymer in the color resist units ranges from 20 wt % to 50 wt %.

14. The display panel according to claim 13, wherein the organic conductive polymer comprises at least one of polythiophene, polyacetylene, or polyaniline.

15. The display panel according to claim 9, the black matrix comprises a plurality of opening areas and a plurality of light-shielding areas, and each of the light-shielding areas is disposed between two adjacent opening areas; and each of the color resist units is disposed in each of the opening areas, and the intersection area is defined between the two adjacent color resist units on one side of the light-shielding areas away from the base substrate.

16. The display panel according to claim 15, wherein a width of each of the light-shielding areas is reduced from one end adjacent to the base substrate to another end away from the base substrate.

17. The display panel according to claim 9, wherein the array substrate is provided with pixel electrodes corresponding to the color resist units by one to one, and an projection area of the color resist units on the array substrate is greater than a projection area of the pixel electrodes.

18. A manufacturing method of a color filter substrate, comprising following steps:
providing a base substrate;
disposing a color filter layer on the base substrate, wherein the color filter layer comprises a plurality of color resist units, and forming an intersection area between two adjacent color resist units, wherein a manufacturing material of the color resist units comprises a photoresist material and a conductive material; and
providing a black matrix on the base substrate;
wherein parts of two adjacent ones of the plurality of color resist units with different colors in the intersection area overlap each other, and a thickness of the parts of the plurality of color resist units located in the intersection area is less than a thickness of another parts of the plurality of color resist units; the black matrix is disposed in the intersection area between two adjacent ones of the plurality of color resist units with a same color, and the intersection area between two adjacent ones of the plurality of color resist units with different colors is not provided with a black matrix.

19. The manufacturing method of the color filter substrate according to claim 18, wherein the step of disposing the color filter layer on the base substrate comprises following steps:
coating a color resist material layer on the base substrate, wherein the color resist material layer comprises display areas for forming the color resist units and intersection areas defined between two adjacent display areas;
exposing the color resist material layer by a grayscale mask, wherein the grayscale mask comprises transparent regions and semi-transparent regions, the transparent regions correspond to the display areas, and the semi-transparent regions correspond to the intersection areas; and
developing the color resist material layer after exposure.

20. The manufacturing method of the color filter substrate according to claim 18, wherein the step of disposing the color filter layer on the base substrate comprises following steps:
dividing the black matrix into light-shielding areas and opening areas;
coating a color resist material layer on the black matrix, and the color resist material layer forms intersection areas on the light-shielding areas;
exposing the color resist material layer by a photomask; and
developing the color resist material layer after exposure.

* * * * *